Aug. 22, 1967   E. M. DAVIS, JR   3,336,679
ANGULAR INCLINATION INDICATOR FOR MOVING MEMBERS
Filed May 19, 1965
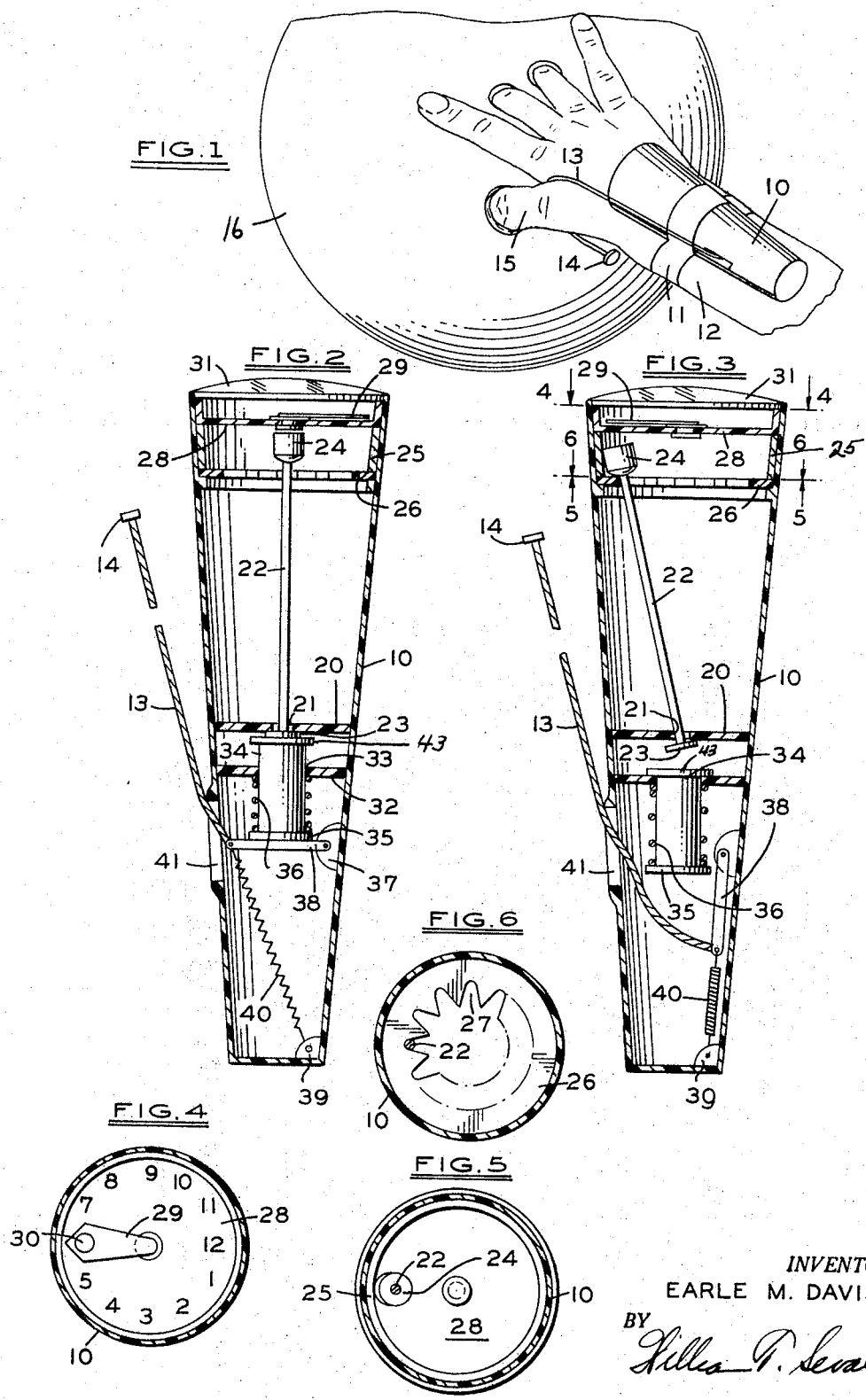
INVENTOR.
EARLE M. DAVIS JR.
BY
*Lillian P. Sevald*
ATTORNEY

United States Patent Office 3,336,679
Patented Aug. 22, 1967

3,336,679
ANGULAR INCLINATION INDICATOR FOR
MOVING MEMBERS
Earle M. Davis, Jr., 6361 Peach Road,
Clarkston, Mich. 48016
Filed May 19, 1965, Ser. No. 456,938
2 Claims. (Cl. 33—207)

ABSTRACT OF THE DISCLOSURE

A device for determining the angular disposition of a member on which it is mounted upon release of its mechanism whereby a weight falls under gravitational influence and is held in position by magnetic force with the position of the weight relative to the device or a dial being indicative of the angular inclination of the member at the time of release but subject to any effective acceleration and centrifugal forces.

---

This invention relates to an indicator device which is mountable on a moving member for determining the angular inclination of the member at any given point or time during movement of the member to indicate the angular inclination of the member at the time or point of release even in the presence of acceleration and centrifugal forces although the gravity influence may be modified in some instances by effective acceleration and centrifugal forces.

The indicator device is particularly suitable for use in bowling for determining the angle of inclination of the bowler's hand at the point in motion and time when the ball is delivered to the alley. The device is explained relative to bowling as an example of the use of the indicator device of the invention. However, it will be understood that the device is usable to indicate the angle of inclination of any member at a given point or time during movement upon release of the device. Thus a baseball pitcher may determine the angular inclination of his hand at the time of releasing the baseball in pitching. Various other uses of the device are within the perview of the invention.

In bowling, the angle of the bowler's hand at the time of releasing the bowling ball on the alley is an important factor because it determines the influence imparted to the ball by the change in the angular inclination of the bowler's hand from its position at the start of bowling to its position at the point of delivery. In other words this imparts spin or lack of spin to the ball. It also determines whether or not the ball is properly delivered.

With the foregoing in view, it is a primary object of the invention to provide an indicating device for bowlers which will give an indication of the angle of inclination of the bowler's hand at the time or point of ball release to the alley.

An object of the invention is to provide an indicator device which is capable of indicating the angle of inclination of a member upon which it is attached at the time the device is released so that the angle of inclination of a member may be determined at any point in its movement by releasing the device of the invention to provide the indication.

An object of the invention is to provide a case having a stem and weight which are held centrally therein prior to release, so that upon release, the stem and weight are urged to fall downwardly due to gravity to the portion of the case which lies at the bottom at the time or point of release.

An object of the invention is to provide a magnet as the weight and an annular ferrous sleeve in the case for holding the weight against the sleeve upon release of the device to make an indication.

An object of the invention is to provide a notched holder member adjacent the sleeve which engages the stem upon the magnet contacting the sleeve to hold the stem in the notch of the holder member to prevent subsequent angular movement of the magnet relative to the sleeve and the case thereby preventing the indication from subsequently changing after the release of the device.

An object of the invention is to provide angular markings on the case, which may be read directly relative to the magnet if desired.

An object of the invention is to provide a dial having angular markings and a pivotally mounted indicator hand having a ferrous indicating end with the hand being positioned and located at the proper angular markings through the magnetic attraction of its ferrous end to the location of the magnet.

An object of the invention is to provide releasable centering or cocking means for the stem and magnet to center the stem and weight centrally of the armature and case.

An object of the invention is to provide means which are automatically releasable at the desired point of motion or time being reached at which an indication of angular inclination is desired.

These and other objects of the invention will become apparent by reference of the following description of an angle of inclination indicating device for moving members embodying the invention taken in connection with the accompanying drawing in which:

FIG. 1 is a perspective view of a bowler's hand partially showing a bowling ball with the indicator device mounted on the bowler's wrist.

FIG. 2 is a longitudinal cross-sectional view of a preferred embodiment of the device showing the plunger stem and weight in elevation with the device in the cocked position.

FIG. 3 is a view similar of FIG. 2 showing the device in the released position.

FIG. 4 is a cross-sectional view of FIG. 3 taken on the 4—4 thereof showing the dial and indicator hand.

FIG. 5 is a cross-sectional view of FIG. 3 taken on the line 5—5 thereof showing the sleeve and weight; and FIG. 6 is a cross-sectional view of FIG. 3 taken on the line 6—6 thereof showing the notched holder member engaging the stem.

Referring now to the drawing wherein like numerals refer to like and corresponding parts throughout the several views, the indicator device of the invention comprises a case 10. A strap 11 on the case 10 attaches the device on a member such as the bowler's hand or wrist 12. The device has a release cord 13 equipped with a button 14 which is trapped between a digit 15 of the bowler's hand and the bowling ball 16. The release cord 13 preferably is an elastic member. Upon release of the bowling ball 16 by the bowler, his digit 15 separates from the ball 16 and releases the trapped engagement of the button 14 and release cord 13 whereupon the device is released to make an indication of the angle of the bowler's hand or wrist at the time or point of release depending on which the case is attached.

More particularly, the case 10 may be annular in cross-section and tapered in length as shown. However, the case may be any size or shape as selected. The case 10 has an internal wall 20. A central aperture 21 is formed in the case wall 20. The central aperture 21 lies on the axis of the case 10. A stem 22 having opposite ends has one end disposed in the aperture 21. A flange 23 is fixed to the stem 22 on the opposite side of the wall 20 from the main portion of the stem 22. The flange 23 is larger than the aperture 21. A magnet 24 is attached to the other end of the stem 22 and constitutes a weight to effect desired gravity fall of the stem upon release.

A ferrous sleeve 25 surrounds the magnet 24 and is attached to the case 10. A holder member 26 lies inside the case adjacent the sleeve 25 and is equipped with inwardly extending notches 27. The notches engage the stem 22 when the magnet 24 lies against the sleeve 25. A dial 28 is fixed in the case outwardly of the sleeve 25. An indicator hand 29 is mounted centrally of and pivotally on the dial 28. The indicator hand 29 may be made of ferrous material or equipped with a ferrous portion or button 30. The dial 28 has markings indicative of angular inclination. These may be clock-dial markings as illustrated. However other markings may be used if desired such as angular degree markings. A watch glass 31 is fixed on the case 10 to cover the indicator hand 29.

A wall 32 in the case has a slide aperture 33 centrally disposed on the axis of the case. A plunger 34 is slidably disposed in aperture 33 of the slide wall 32. The plunger is equipped with a back flange 35 and a front flange 43. A spring 36 abuts the back flange 35 and the wall 32 and normally urges the plunger 34 endwise towards the right as seen in the drawings and illustrated in FIG. 3 with the front flange 43 lying against the wall 32.

A support 37 is fixed on the case 10 adjacent the plunger 34. An arm 38 is pivotally mounted on the support 37. A support 39 is fixed in the end of the case 10. A relatively light spring 40 extends between the support 39 and the outer end of the arm 38. The relatively heavy elastic release cord 13 is also attached to the outer end of the arm 38. An elongated slot 41 is formed in the case to provide an aperture for the release cord 13. The release cord, when an elastic member, is stronger than the spring 40. Thus pulling the release cord 13 first stretches the spring 40 and then stretches the cord 13. The elastic release cord 13 allows for various dimensions and adjusts automatically to difference in distance between the device and the point of securing the cord 13 prior to release.

FIG. 3 illustrates the released condition of the device. FIG. 2 illustrates the cocked condition of the device. To cock the device, the user pulls on the release cord 13 and swings the arm 38 downwardly from the position seen in FIG. 3 to the position seen in FIG. 2. In its movement from the position shown in FIG. 3 to its position shown in FIG. 2 the arm 38 contacts the rear of the plunger 34 and moves the plunger from the position seen in FIG. 3 to the position seen in FIG. 2. This tensions the spring 40. It will be understood therefore that upon release of the release cord 13 that the spring 40 quickly withdraws the arm 38 from abutting the rear of the plunger 34. This allows the spring 36 to quickly move the plunger from the position illustrated in FIG. 2 to the position illustrated in FIG. 3.

When the arm 38 is swung from the position of FIG. 3 to the position of FIG. 2 it compresses the spring 36 and moves the plunger 34 against the flange 23 fixed on the stem 22. This forces the flange 23 against the wall 20. The forced engagement between the flange 23 and the wall 20 lifts the stem 22 and magnet 24 and the stem 22 in the position of FIG. 2 in the cocked position and condition. This position and condition is maintained by maintaining tension on the release cord 13 such as by trapping the button 14 between a bowler's finger 15 and a bowling ball 16.

Upon release of the release cord 13, the arm 38 retracts as previously described and the plunger 34 releases its pressing force against the flange 23 on the stem 22 and the magnet 24 drops downwardly toward the portion of the case at a bottom position at the time. This may be any circumferential portion of the case at the time of release. Thus the weight may fall relative to the case in any angular position of the case in a 360 degree circle. Upon the magnet 24 falling against the sleeve, the stem 22 falls in one of the notches 27 of the holder member 26. The magnet then holds against the sleeve 25 through magnetic attraction and the notch 27 prevents further angular movement of the stem and magnet 24 regardless of subsequent movement of the case 10. By then rotating the case 10 slightly the indicator hand 29 ferrous portion 30 will find the magnet and take the position of the magnet through the magnetic attraction therebetween. The indicator hand 29 may then be read relative to the dial 28 to read the angle of inclination of the member at the point or time of release of the device.

In use, the bowler straps the device to his wrist or hand. He then pulls the release cord 13 cocking the device and traps the release cord between his digit 15 and the bowling ball 16. He then takes his normal position in bowling and bowls the ball. Upon his hand separating from the ball at the point of delivery the release cord is released. This permits the release of the device and it uncocks. Upon the device uncocking the magnet-weight 24 falls to the bottom of the case at the time or point of release. The magnet then freezes against the armature with the stem 22 in a notch 27 of the holder member 26. This prevents subsequent moving of the magnet 24 relative to the sleeve 25 upon the case subsequently changing angular inclination with further angular movement of the bowler's hand after the time or point of release. The bowler then looks at the dial through the watch glass 31 and rotates the case until the hand finds the magnet whereupon the indicator hand 29 takes a fixed position due to magnetic attraction with the magnet 24. The bowler then reads the angle of inclination at which he released the ball.

While the device has been described and disclosed as suitable for reading angles of inclination relative to bowling and other sports, it is obvious that the device is usable for other purposes if desired. The device provides a means for determining the angle of inclination of a moving member at any point during movement at which it is released even in the presence of acceleration and centrifugal forces although the gravity influence may be modified somewhat in some instances by the presence of effective acceleration and centrifugal forces.

Although but a single embodiment of the invention has been shown and described in detail, it is obvious that many changes may be made in the size, shape, detail and arrangement of the various elements of the invention within the scope of the appended claims.

I claim:

1. An indicator device mountable on a member for determining the angular position of a member which may be moving and changing its angular disposition at the time to provide an indication of the angular position of the member at a point in time, action, and movement subject to any effective acceleration and centrifugal forces, comprising a case mountable on a member, a dial in said case having angular markings, an indicator centrally pivotally mounted on said dial relative to said markings having a pivoted central end and an extending indicating end;

said indicator having a ferrous portion at least adjacent its said extending indicating end;

an annular ferrous sleeve adjacent said dial and indicator inside said case, an annular internally notched holder member adjacent said sleeve, a magnet located inside of said sleeve between said holder member and said dial, a wall in said case spaced from said holder member and sleeve on the side of said sleeve which is opposite from said dial having a central aperture, a stem on said magnet leading past said notched holder member through said aperture of said wall, a head on said stem adjacent said wall, said head being larger than said aperture in said wall, a slide in said case adjacent said wall and head, means in said case movably supporting said slide, a spring resiliently biasing said slide away from said head on said stem, an arm pivoted on said case adjacent said slide, resilient means normally holding said arm away from said slide, and a cord attached to said arm for swinging said arm against said slide to move said slide compressing said spring against said head on said stem to force said head against said wall;

said head upon being forced against said wall holding said stem axially of said case with said magnet axially centered relative to said sleeve;

said cord being held in tension by the member to which said case is attached to locate said magnet centrally of said sleeve during changing angular position of the member, said cord being releasable by the member at any desired point of time, movement, and action to permit said resilient means to move said arm away from said slide in turn to permit said spring to move said slide away from said head on said stem permitting said magnet to fall under gravity against said sleeve with said stem falling in a notch of said holder member;

said magnet then holding said stem in said notch and said notch preventing movement of said magnet;

said magnet then locating said indicator extending end relative to said dial through magnetic attraction;

said indicator so located indicating on said dial the angular position of said magnet;

said markings on said dial showing the angular position of said dial at the point of release of said cord;

thereby providing indication of the angular position of a member at that point subject to any effective acceleration and centrifugal forces.

2. An indicator device mountable on a member for determining the angular inclination of a member at any given point and time during movement of the member at which the device is released to indicate the angular inclination at that point, subject to any effective acceleration and centrifugal forces, comprising a case having opposite front and rear ends and a central axis extending between said ends; said case being attachable to a member whose angular inclination is to be indicated; said case thereby changing its angular inclination angularly of its axis as the member changes its angle of inclination, a wall in said case spaced from said case front end having an aperture on the axis of said case;

a stem having a rear end lying in said wall aperture and a front end extending to a point adjacent said case front end, said wall aperture loosely supporting said stem rear end to permit said stem front end to fall downwardly under gravitational influence against said case, a magnet on said stem front end, centering means adjacent said wall for releasably holding said stem and magnet on the axis of said case, a ferrous sleeve in said case adjacent said case front end surrounding said magnet in equally spaced relationship when said magnet is centered on said axis, a holder member having radially inwardly opening notches adjacent said armature for receiving said stem in one of its notches when said magnet lies against said armature to prevent angular movement of said magnet, release means for releasing said centering means during movement of said case on a member;

said magnet falling downwardly against said armature under gravitational influence with said stem falling downwardly with said magnet into one said notch of said holder member, said magnet holding said stem in said notch of said holder member through magnetic attraction to said sleeve; said stem and notch engagement preventing subsequent angular movement of said magnet thereby fixing the angular location of said magnet as an indicator of the angular inclination of said case and a member on which said case is mounted at the point of release, and markings on said case for showing the angular position of said magnet.

References Cited

UNITED STATES PATENTS

| | | | |
|---|---|---|---|
| 2,486,529 | 11/1949 | Jackson | 33—205 |
| 2,557,654 | 6/1951 | Hagner | 33—206 |
| 3,206,200 | 9/1965 | Butan | 33—207 X |

LEONARD FORMAN, *Primary Examiner.*

L. ANDERSON, *Assistant Examiner.*